United States Patent [19]

Abe

[11] Patent Number: 4,805,498

[45] Date of Patent: Feb. 21, 1989

[54] APPARATUS FOR CUTTING ADHESIVE TAPE ROLL STOCKS

[75] Inventor: Shunetsu Abe, Tokyo, Japan

[73] Assignee: Pioneer Koki Co., Ltd., Tokyo, Japan

[21] Appl. No.: 170,963

[22] Filed: Mar. 15, 1988

[30] Foreign Application Priority Data

Mar. 19, 1987 [JP] Japan ................................ 62-062580

[51] Int. Cl.[4] .......................... B23B 3/32; B23B 13/04

[52] U.S. Cl. .......................................... 82/92; 82/101; 82/102

[58] Field of Search ...................... 82/87, 91, 101, 102, 82/92-94, 46, 70.2

[56] References Cited

U.S. PATENT DOCUMENTS 3,344,696 10/1967 Harvey .................................. 82/101
3,861,252 1/1975 Stoffels et al. ..................... 82/101 X
3,861,253 1/1975 Witcraft et al. .................. 82/101 X

FOREIGN PATENT DOCUMENTS 2941151 5/1981 Fed. Rep. of Germany ........ 82/101
877115 1/1977 Japan .

*Primary Examiner*—Frank T. Yost
*Assistant Examiner*—Hien H. Phan
*Attorney, Agent, or Firm*—Armstrong, Nikaido Marmelstein & Kubovcik

[57] ABSTRACT

A feeder is provided for feeding a plurality of adhesive tape roll stocks to a cutting section, a tape stock holding device having a plurality of shafts to be inserted into corresponding paper bobbins of tape stocks, and a cutting blade receiving shaft device having receiving shafts to be inserted into the corresponding bobbins, are provided. At the cutting section, the tape stocks are held by the shafts receiving shafts and chucks. Each tape shock is rotated by the chuck and cut by a disk cutter.

4 Claims, 10 Drawing Sheets

APPARATUS FOR CUTTING ADHESIVE TAPE ROLL STOCKS

BACKGROUND OF THE INVENTION

The present invention relates to an apparatus for cutting adhesive tape roll stocks into product rolls.

An adhesive tape roll is manufacured by cutting an elongated roll stock into a predetermined length. A conventional cutting process includes feeding a tape roll stock to a cutting section, chucking the tape roll stock, feeding the chucked stock a predetermined length, cutting the stock into product rolls, and discharging the product rolls. In the conventional apparatus, at most two adhesive tape roll stocks can be cut at the same time, because of requirements for the accuracy of the product. In addition, speed of production can not be increased due to constructional limitations.

SUMMARY OF THE INVENTION

The object of the present invention is to provide an apparatus which may cut a plurality of adhesive tape roll stocks at the same time, thereby remarkably improving the productivity.

According to the present invention, there is provided an apparatus for cutting adhesive tape roll stocks comprising a feeder for feeding a plurality of adhesive tape roll stocks to a cutting section, in a parallely arranged state, a tape stock holding device having a plurality of shafts each of which is arranged to be axially moved so as to be inserted into a corresponding paper bobbin of a tape stock, a cutting blade receiving shaft device having axially movable receiving shafts each of which is to be inserted into the corresponding bobbin, a chucking device having chucks each of which is arranged to be axially moved and to grip the corresponding bobbin and to rotate the bobbin, and a cutting device having cutters for cutting the tape stocks at predetermined positions on the receiving shaft.

In an aspect of the invention, each chuck is provided coaxially with the shaft and has a cylindrical spindle into which the shaft is inserted, and the cutting blade receiving shaft device is arranged so as to remove a cut out tape by retracting the receiving shaft.

The other objects and features of this invention will be apparently understood from the following description with reference to the accompanying drawings.

DETAILED DESCRIPTION OF THE PREFERRED EMBODIMENT

Figure 1:
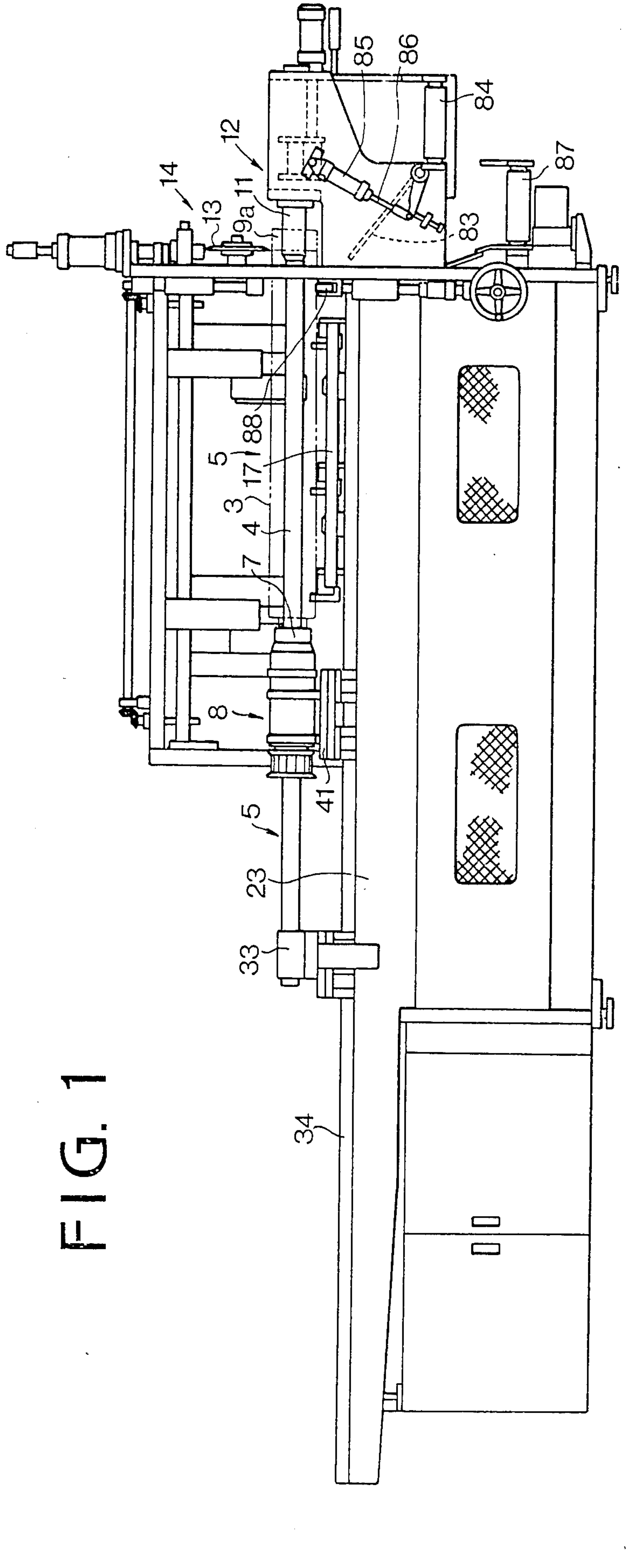
FIG. 1 is a side view of an apparatus for cutting an adhesive tape roll stock according to the present invention.
Figure 2:
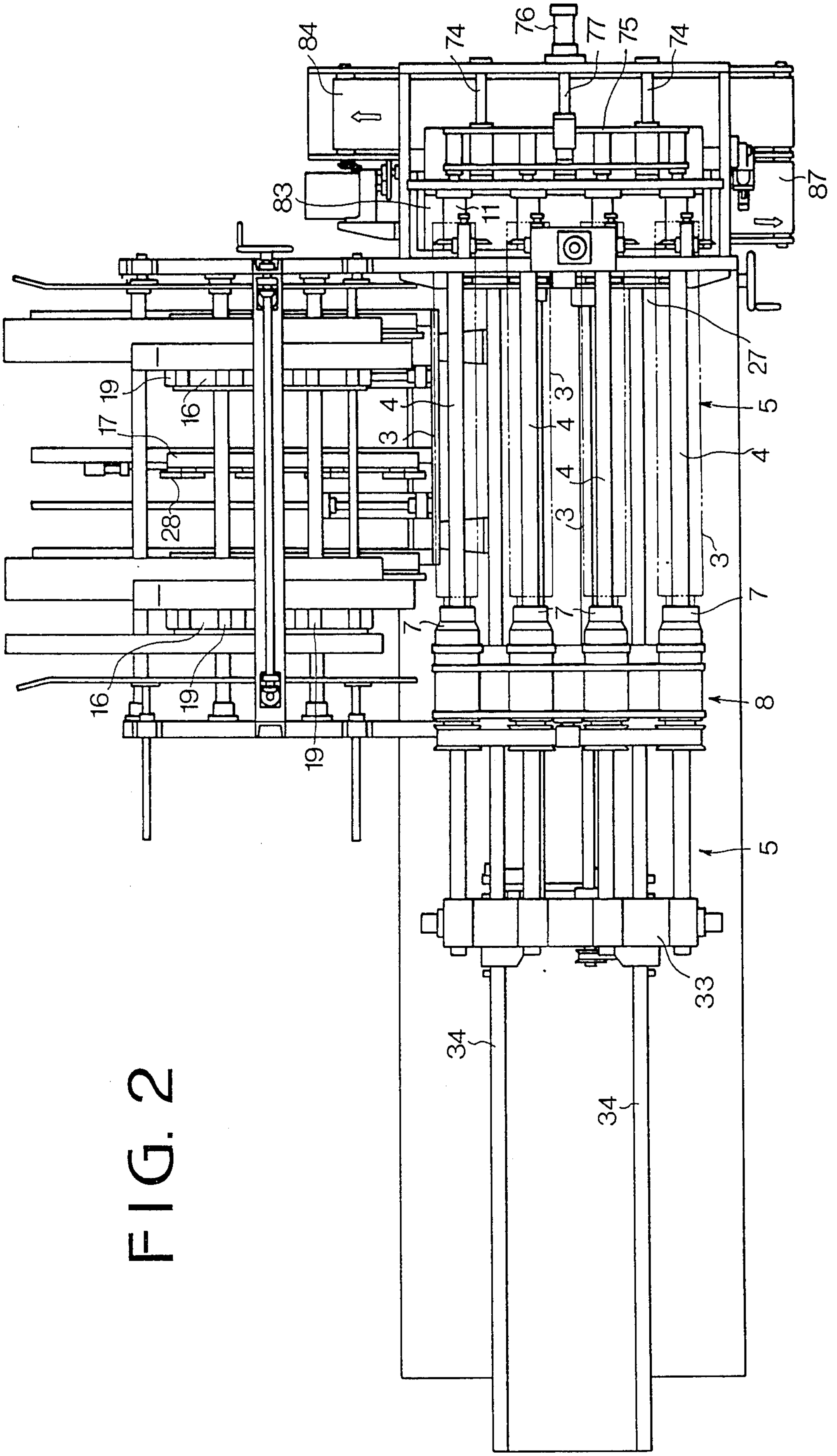
FIG. 2 is a plan view of the apparatus.
Figure 3:
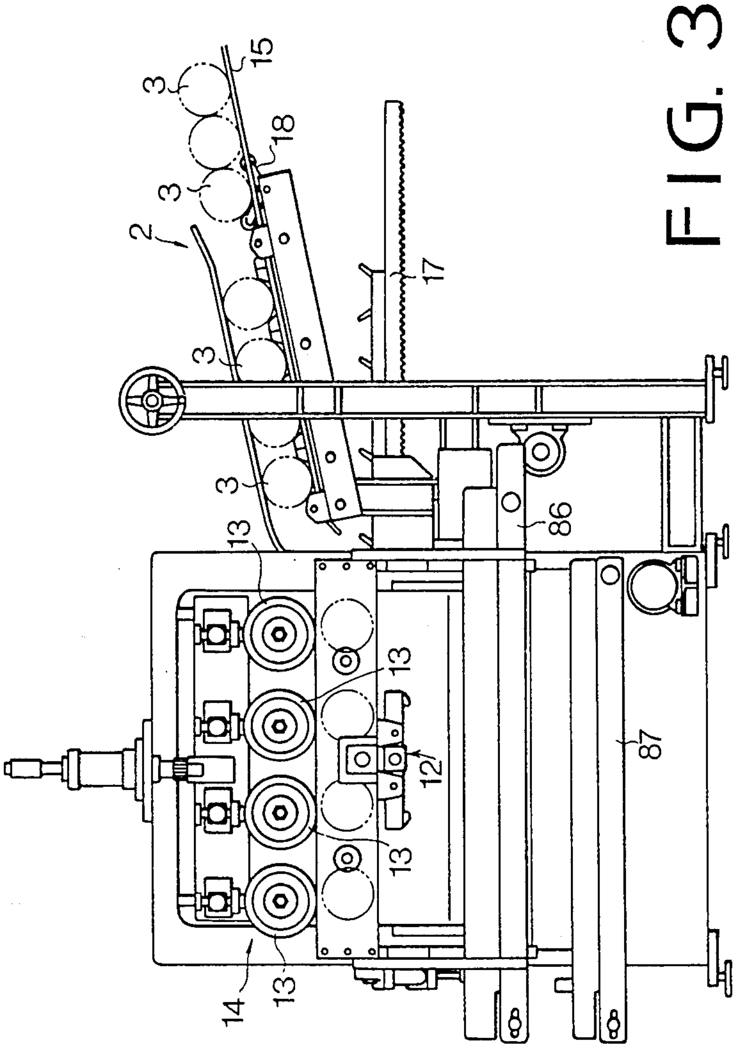
FIG. 3 is a front view of the apparatus.

Referring to FIGS. 1 to 3, the apparatus of the present invention has an adhesive tape roll stock (hereinafter called tape stock) feeder 2, tape stock holding device 5, chucking device 8, cutting blade receiving shaft device 12, and cutting device 14.

Figure 4:
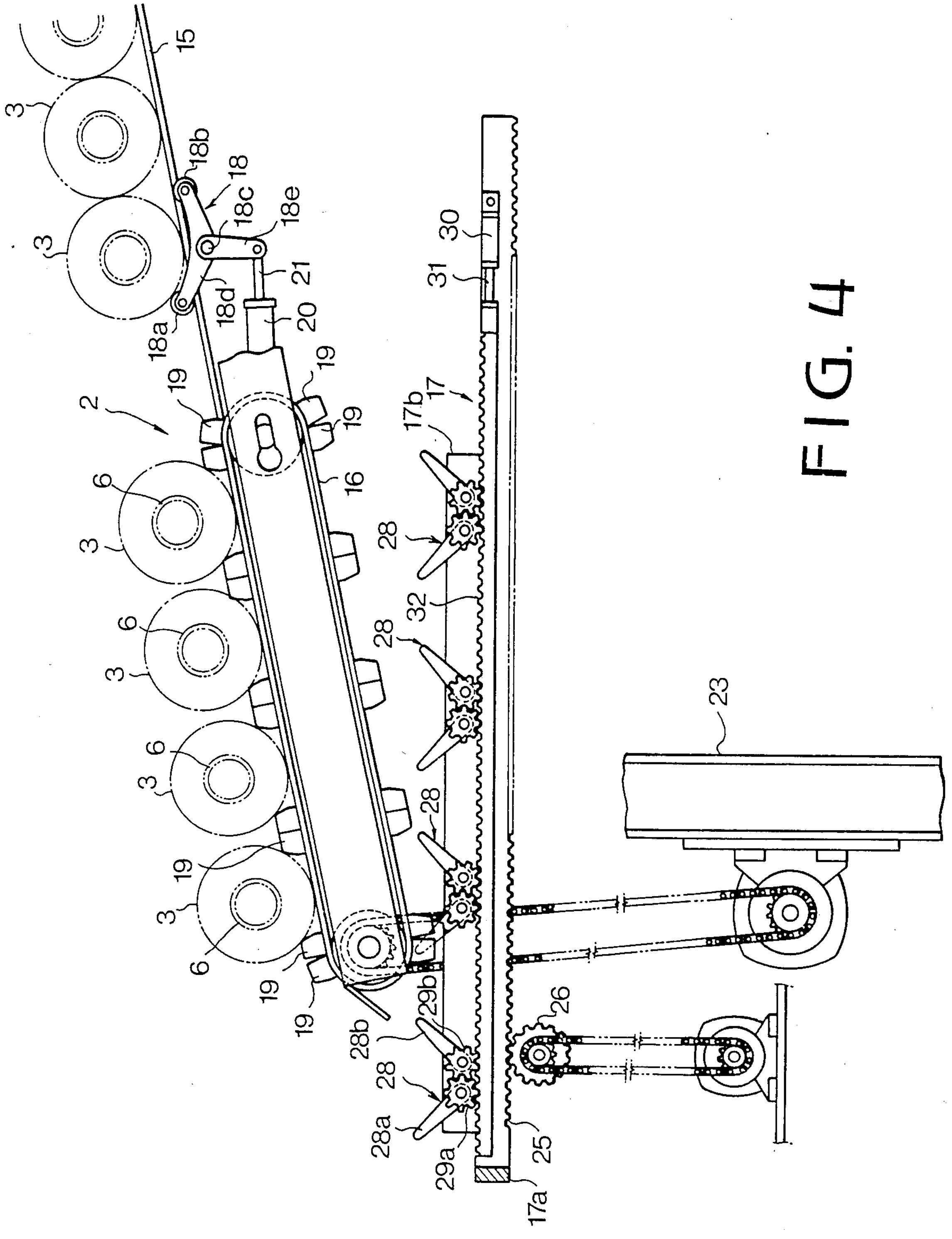
FIG. 4 is a front view of an adhesive tape roll stock feeding device of the present invention.

Referring to FIGS. 2 to 4, the tape stock feeder 2 has a shoot 15 for storing tape stocks 3 and for feeding one by one, a pair of belt conveyers 16 each having projections 19 at a regular intervals corresponding the tape stock 3, and feeding device 17 under the conveyers 16. A pair of stoppers 18 are provided at a front portion of the shoot 15. As shown in Fig. 4, each stopper 18 comprises a V-shaped lever **18*d* having a front roller 18*a* and rear roller 18*b* and pivotally mounted on a shaft 18*c*. The lever 18*d* is operatively connected to a piston rod 21 of an air cylinder 20 through a lever 18*e*. When the rod 21 is projected, the lever 18*d* is counterclockwisely pivoted to release the front most tape stock, to feed it to the conveyers 16 and to stop the next stock. When the rod 21 is retracted, the lever 18*d*** is clockwisely pivoted to receive the next stock.

The conveyers 16 are moved in synchronism with the operation of the stopper 18 to receive the fed stock 3 between projections 19. When four tape stocks are mounted on the conveyers 16, the feeding operation of the stopper 18 stops.

Figure 5:
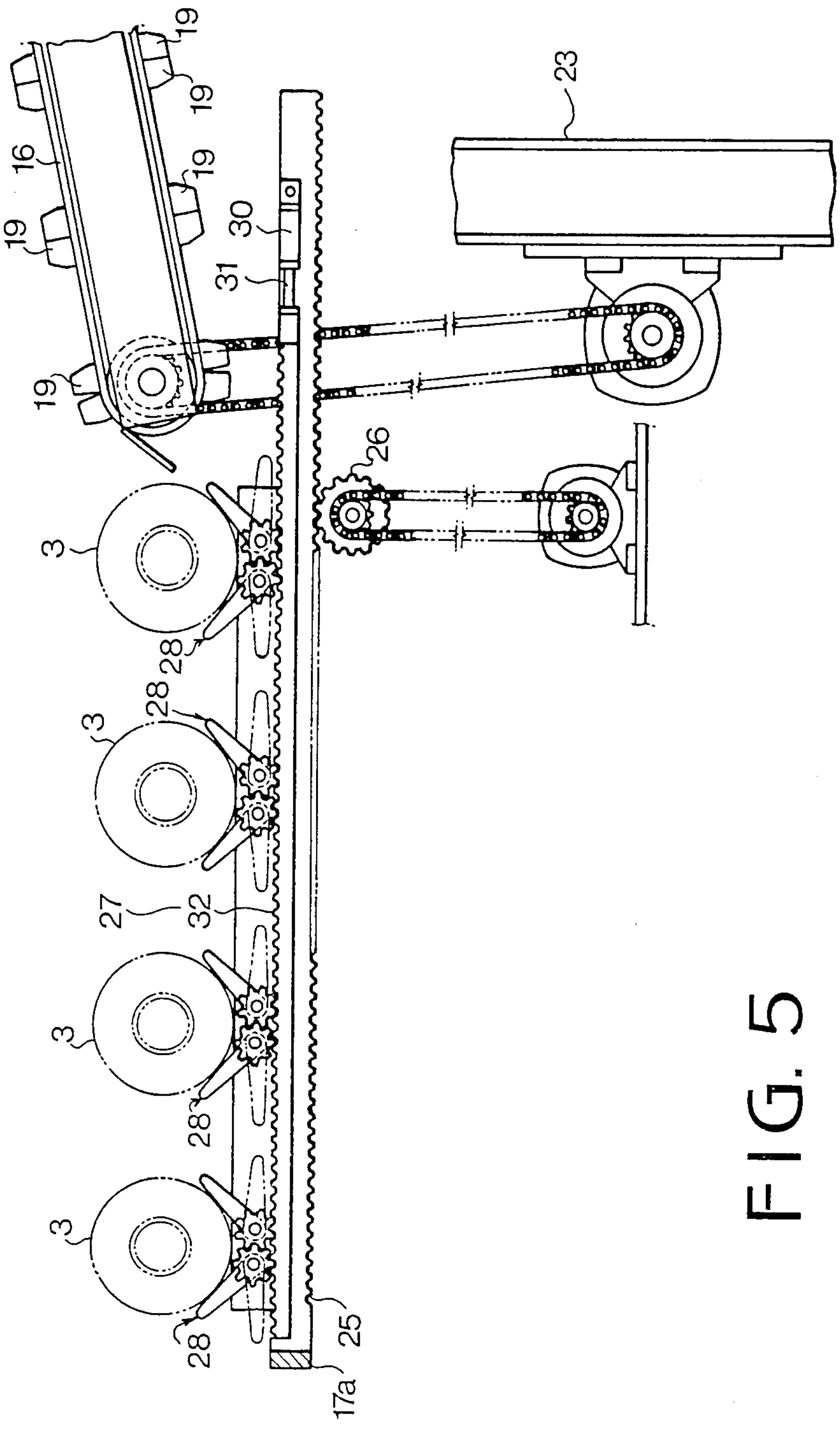
FIG. 5 is an illustration showing operations of the feeding device.
Figure 6:
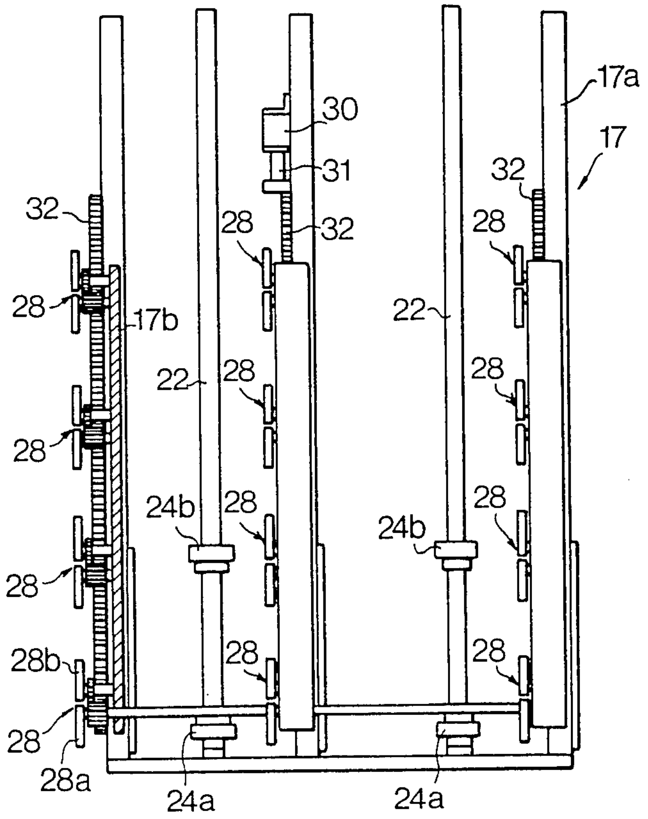
FIG. 6 is a plan view of the feeding device.
Figure 7:
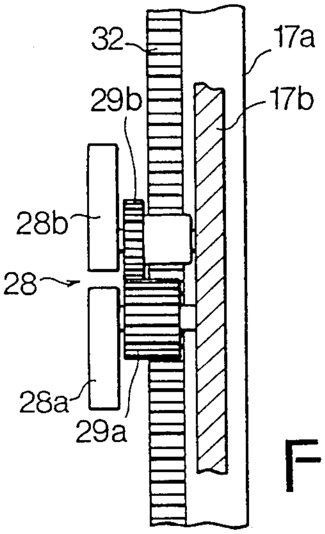
FIG. 7 is an enlarged view of a part of FIG. 6.

Referring to FIGS. 4 to 7, feeding device 17 has a frame **17*a* and a pair of guide bars 22. The guide bars 22 are slidably mounted in bearings 24*a* and 24*b* secured to a machine frame 23 (FIG. 1), thereby supporting the frame 17*a*. Mounted on the underside of the frame 17*a* are a pair of racks 25 which engage with pinions 26, respectively. Thus, the frame 17*a* is reciprocated in the stock feeding direction by the rotation of pinions 26. On the frame 17*a*, four sets of stock holding devices 28 are provided, arranged in the feeding direction, each set of which comprises three holders (FIG. 6). Each holder comprises a pair of arms 28*a*, 28*b*, each of which is pivotally mounted on a supporting plate 17*b* securely mounted on the frame 17*a*. As shown in FIG. 7, a pivot of arm 28*a* has a wide pinion 29*a* and a pivot of arm 28*b* has a narrow pinion 29*b* engaged with pinion 29*a*. The wide pinion 29*a* engages with a rack 32 slidably mounted on the frame 17*a*. The rack 32 is reciprocated by a piston rod 31 of an air cylinder, so that the arms 28*a*, 28*b* are pivoted to the V-shaped position and to the horizontal position shown by chain lines in FIG. 5**.

In accordance with a feed command, the conveyers 16 and feeding device 17 are operated in synchronism with each other. From the positions of FIG. 4, tape stock 3 is discharged from the conveyers 16 one by one and received in the holder formed in V-shape by arms **28*a*, 28*b* of feeding device 17. The frame 17*a* is moved to the cutting section 27, as the tape stock 3 is fed from the conveyers. FIG. 5 shows a state of the feeding device 17 at the cutting section 27. As described hereinafter, four tape stocks 3 in the cutting section 27 are held by the tape stock holding device 5. After tape stocks are held, rack 32 is moved to the right in FIG. 5, so that arms 28*a*, 28*b* are pivoted to the horizontal positions. After that the frame 17*a* is returned to the initial position of FIG. 4, and arms 28*a*, 28*b*** are pivoted to the V-shape position.

Figure 8:
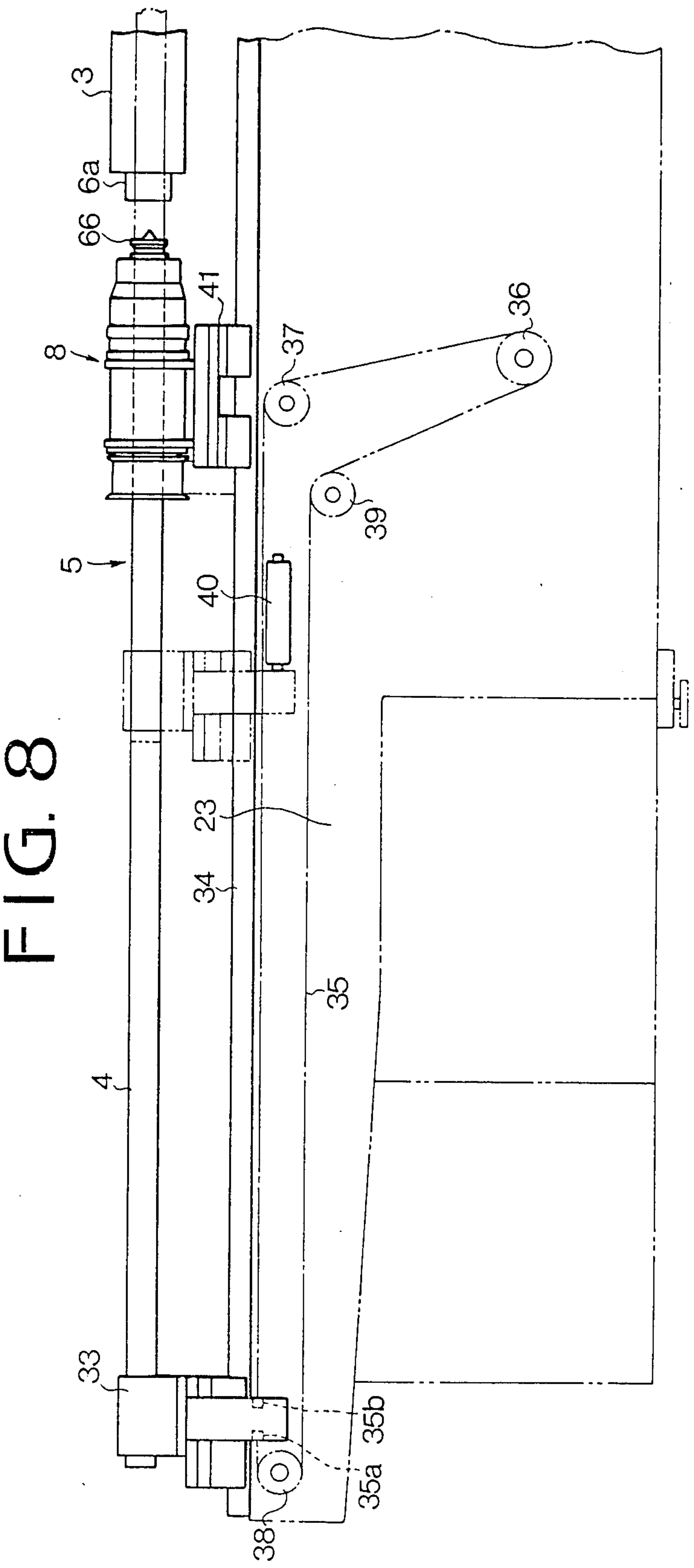
FIG. 8 is a side view of a tape stock holding device.
Figure 9:
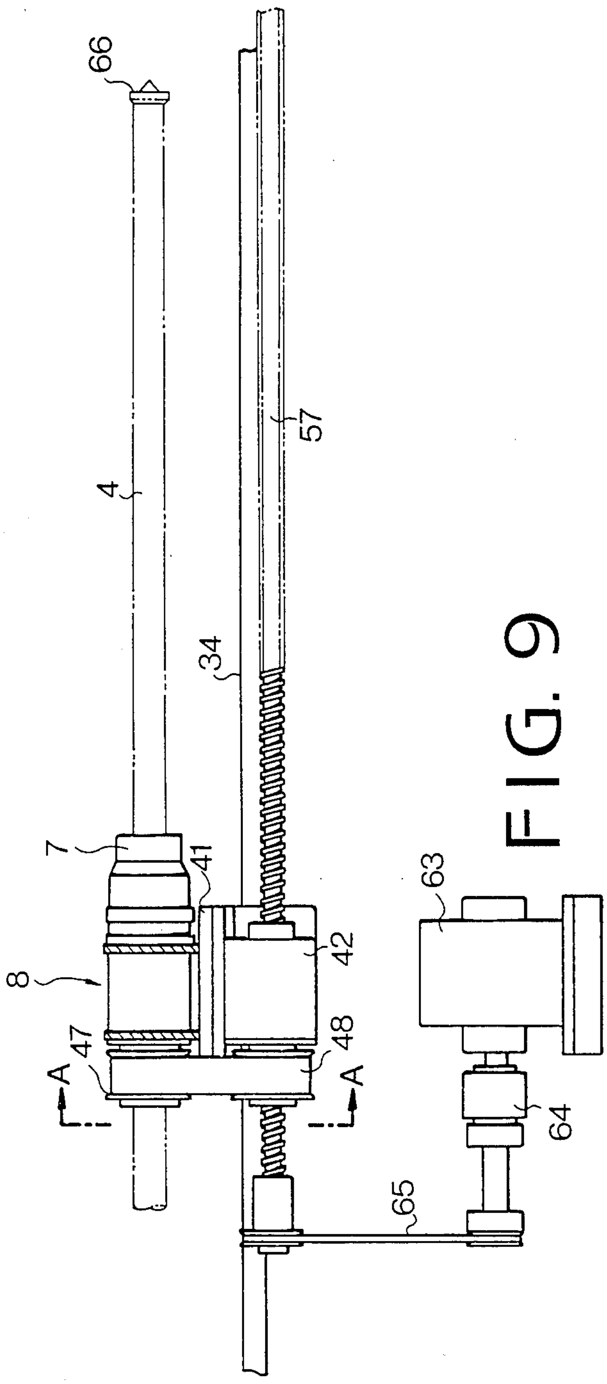
FIG. 9 is a side view showing a chucking device.

Referring to FIGS. 1, 2 and 8, the tape stock holding device 5 has a stock 33 slidably mounted on a pair of rails 34 and four supporting shafts 4 which are disposed in parallel. Each shaft 4 is supported by the stock 33 at a rear end thereof and by a cylindrical spindle 45 (FIG. 12) of a chuck 7 of the chucking device 8. Both ends 35*a*, 35*b* of a chain 35 which engages with sprocket wheels 36, 37, 38 and 39 are connected to the stock 33. The stock 33 is moved to a stopper 40 by the rotation of the sprocket wheels 36.

Referring to FIGS. 8 to 11, the chucking device 8 has a slide 41 slidably mounted on the rails 34 and a nut box 42 secured to the underside of the slide 41. A nut in the box 42 engages with a feed screw 43 which is covered by flexible covers 89*a*, 89*b* and connected to a motor 44 through a belt and pulley device, so that the slide 41 is reciprocated along rails 34 by the motor 44. On the slide 41, four chucks 7 are mounted, each of which is provided coaxial with supporting shaft 4.

Figure 12:
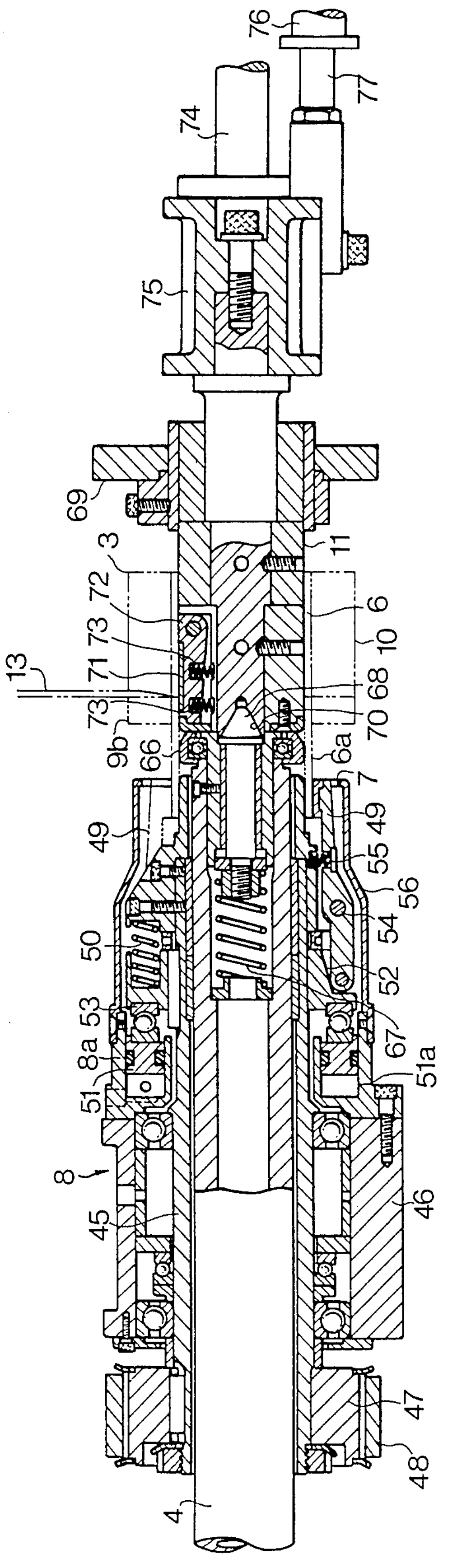
FIG. 12 is a sectional view of a chuck.

Referring to FIG. 12, the chuck has a casing 46 in which the spindle 45 is rotatably mounted by ball bearings. Four jaws 49 are provided in a front portion of the spindle at 90 degrees angular displacement. Each jaw 49 is provided in a slit formed in the spindle and pivotally mounted on a shaft 54. A rear end of the jaw 49 engages with a clylindrical cam 52 which is urged by a spring 50 to a cylindrical piston 51 through a ball bearing 53. These elements are covered by a cover 56. When compressed air is supplied to a cylinder 51*a* to push the cam 52 by means of the piston 51, jaws 49 are contracted by the cam to grip a paper bobbin 6 of the tape stock 3 at a projected portion 6*a*, as described hereinafter. When the air in the cylinder 51*a* is drained, the piston 51 is returned by the spring 50, and each jaw 49 is expanded by a return spring 55 to release the paper bobbin 6.

Figure 10:
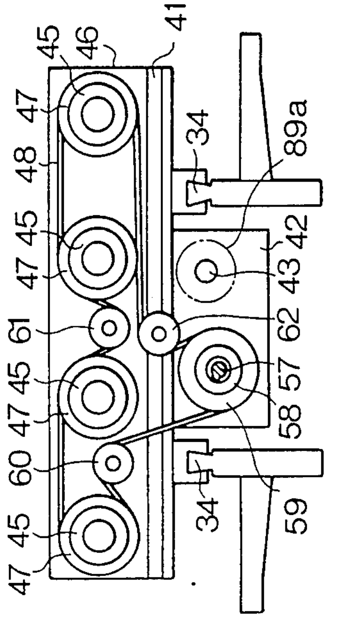
FIG. 10 is a rear view of the chucking device as viewed along arrows A—A of FIG. 11.
Figure 11:
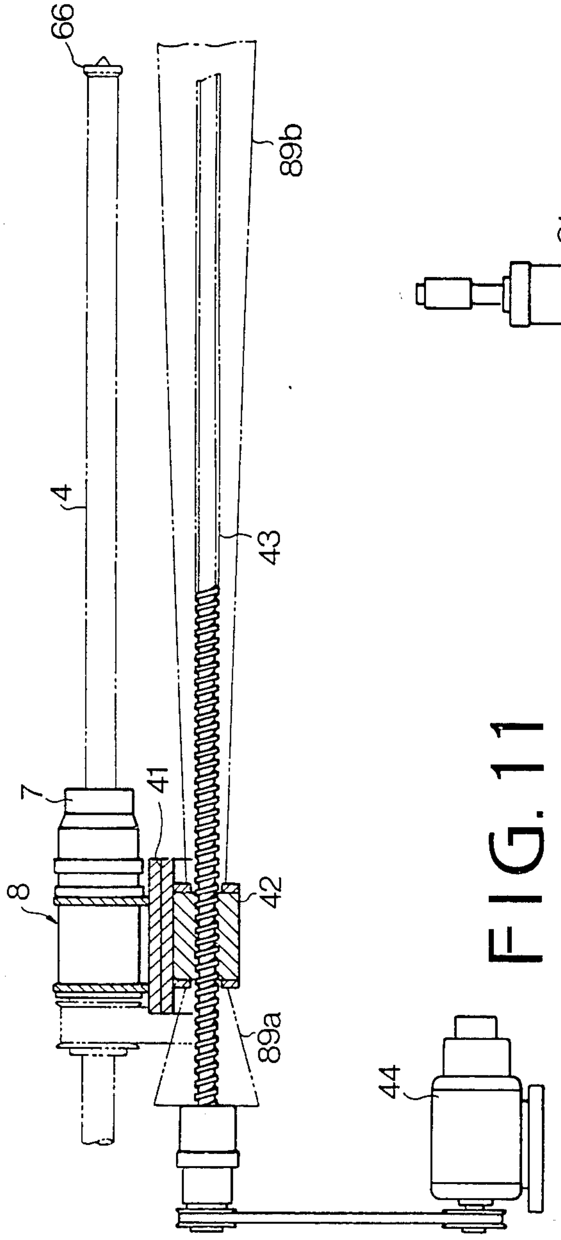
FIG. 11 is a side view of the chucking device.

A toothed pulley 47 is secured to the spindle 45. As shown in FIG. 10, a timing belt 48 engages with pulleys 47 of all chucks and with a drive pulley 59 and tension pulleys 60, 61 and 62. A cylindrical drive pulley 59 is rotatably mounted in the box 42 and engages with a shaft 58 of spline shaft 57. The shaft 57 is operatively connected to a motor 63 through a chain 65 and a clutch 64. Thus, the shaft 57 is rotated by the motor, so that spindle 45 is rotated through timing belt 48 and pulley 47.

On the front end of the supporting shaft 4, a supporting ring 66 is rotatably mounted and a center 68 is slidably mounted in the shaft 4 and biased by a spring 67 to a projected position.

Referring to FIGS. 2 and 12, the cutting blade receiving shaft device 12 includes four shafts 11 each corresponding to the shaft 4. The shaft 11 is slidably supported by a frame 69 and connected to a connecting member 75 which is slidably mounted on a pair of guide shafts 74. On the shaft 11, a blade receiving member 72 having a receiving chip 71 of sintered hard alloy is pivotally mounted in a recess and urged by springs 73 to an operating position. The connecting member 75 is connected to a piston rod 77 of an air cylinder 76.

Figure 13:
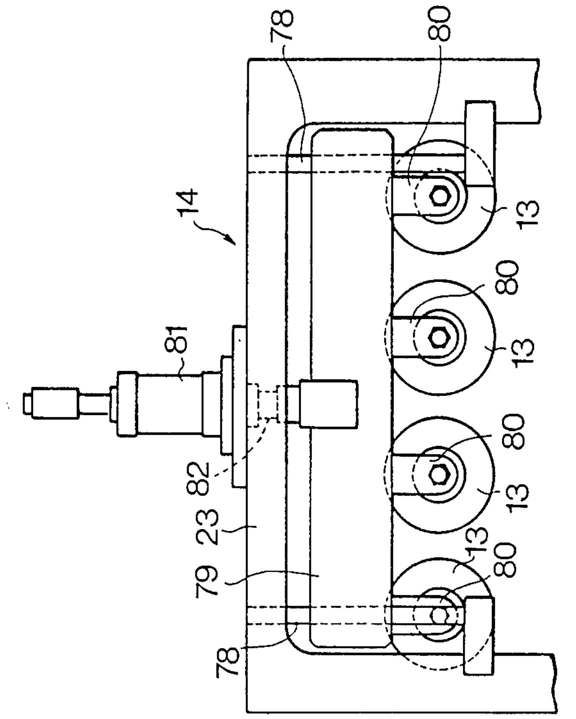
FIG. 13 is a rear view of a cutting device.

Referring to FIG. 13, the cutting device has four disk cutters 13 each corresponding to the receiving chip 71. Each cutter is rotatably supported on a holder 80 and secured thereto by a nut. The holder 80 is secured to a supporting plate 79 which is vertically slidably engaged with a pair of guide shafts 78 and operatively connected to a piston rod 82 of an air cylinder 81.

In operation, when four tape stocks are fed to cutting section 27 (FIG. 5), shafts 11 are inserted into the corresponding paper bobbins 6 by the operation of piston rod 77 of air cylinder 76 and shafts 4 and a front end portion of the spindle 45 are also inserted into the corresponding paper bobbins 6. The shaft 4 stops when the front end thereof abuts on the end of the shaft 11 and the center 68 engages with a conical hole 70. Each chuck 7 is moved to the bobbin 6 and grips the projected portion 6*a* on the spindle, and then rotated to rotate the tape stock 3. Cutters 13 are lowered and engaged with rotating tape stock 3, thereby cutting the tape stocks. When the cutting finishes, the shafts 11 are moved away from the shaft 4 by the air cylinder 76, so that the cut out tapes 9*a* (FIG. 1) are removed from shafts 11 and dropped. At that time, the tape stock 3 on shaft 4 is supported by a supporting roll 88 (FIG. 1). Thereafter, shafts 11 are moved again to shafts 4, and chucks 7 are fed a predetermined stroke. Thus, cutting is repeated. Product tapes 10 (FIG. 12) are fed to a belt conveyer 84 through a shoot 83, and waste tapes 9*a*, 9*b* (FIG. 12) at both ends are discharged to a belt conveyer 87, where the shoot 83 is retracted by the operation of a piston rod 86 of an air cylinder 85. When the cutter blade wears, the angular position of the cutter 13 is changed by releasing the nut so as to engage a new blade portion with the tape stock. Although the cutter 13 is fixed to the holder 80, the cutter may be rotatably mounted on the holder so as to rotate with the tape stock.

From the foregoing, it will be understood that the present invention provides an apparatus which may cut four or more tape stocks at the same time with accuracy at high speed.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An apparatus for cutting adhesive tape roll stocks comprising:
   - a feeder for feeding a plurality of adhesive tape roll stocks to a cutting section, in a parallely arranged state;
   - a tape stock holding device having a plurality of shafts each of which is arranged to be axially moved so as to be inserted into a corresponding paper bobbin of a tape stock;
   - a cutting blade receiving shaft device having axially movable receiving shafts each of which is to be inserted into the corresponding bobbin from the opposite end thereof;
   - a chucking device having chucks each of which is arranged to be axially moved and to grip the corresponding bobbin and to rotate the bobbin; and
   - a cutting device having cutters for cutting the tape stocks at predetermined positions on the receiving shaft.

2. The apparatus according to claim 1 wherein each the chuck is provided coaxially with the shaft and has a cylindrical spindle into which the shaft is inserted.

3. The apparatus according to claim 1 wherein the cutting blade receiving shaft device is arranged so as to remove a cut out tape by retracting the receiving shaft.

4. The apparatus according to claim 1 wherein each the cutter is a disk cutter.

* * * * *